United States Patent Office 2,750,730
Patented June 19, 1956

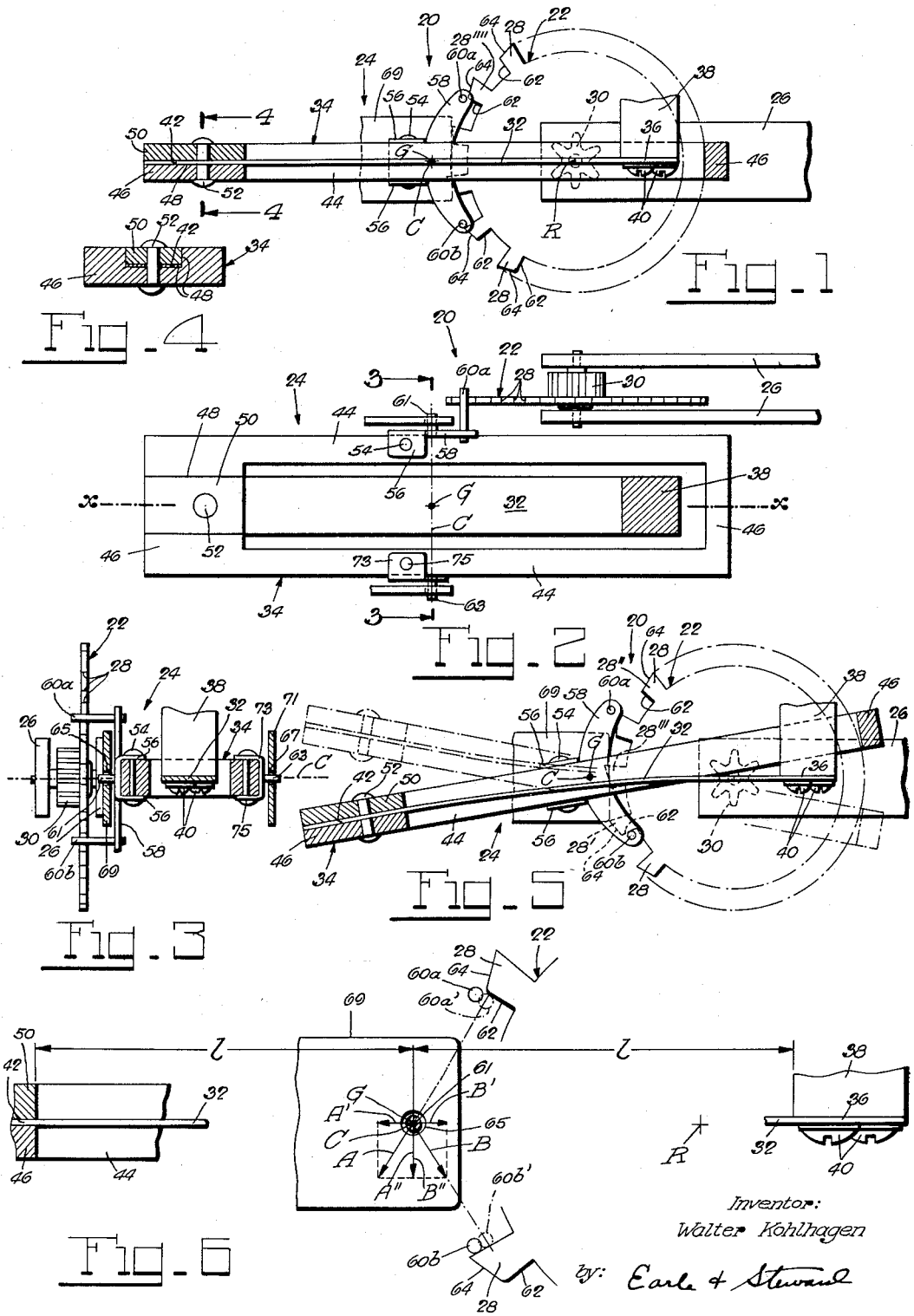

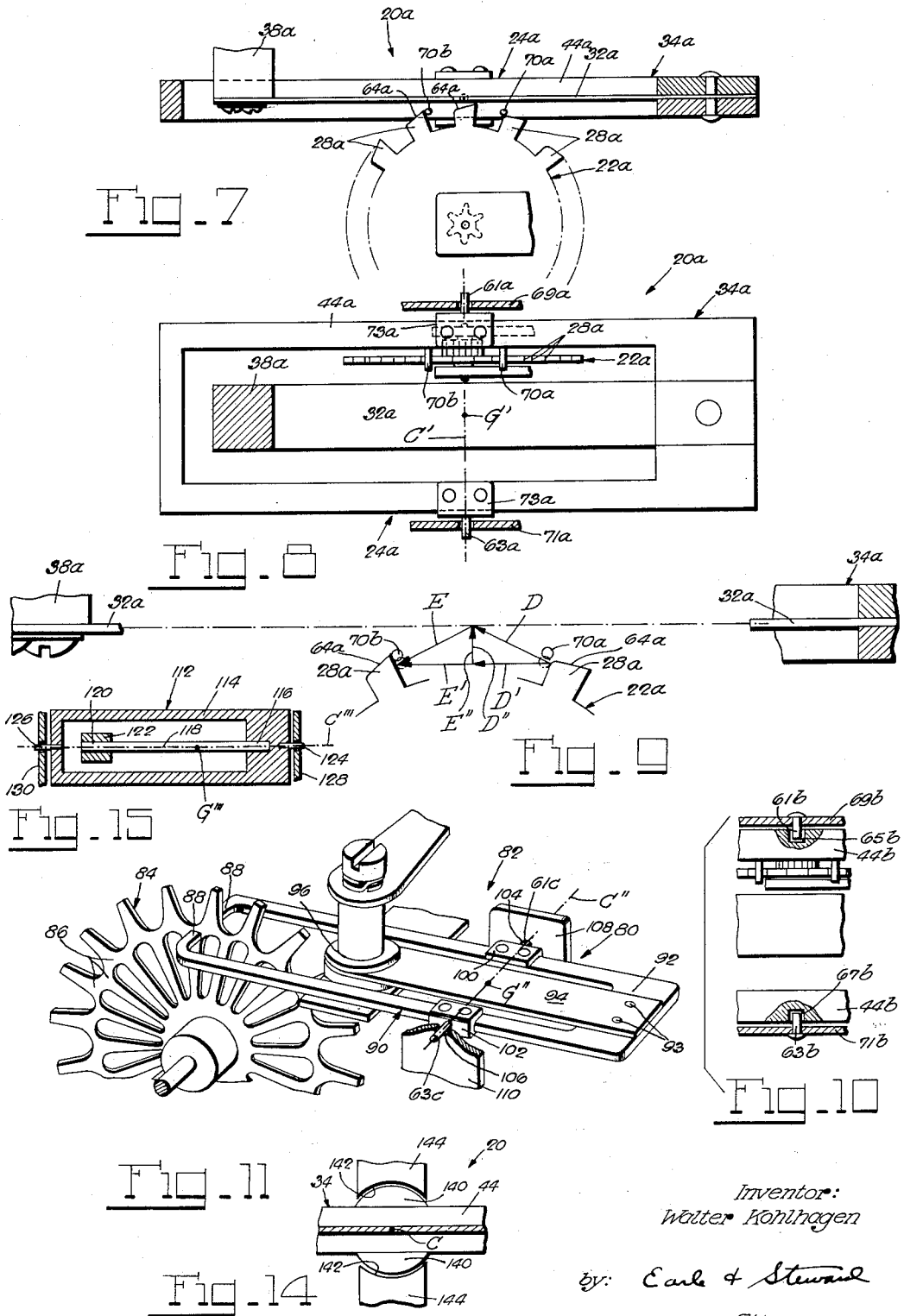

2,750,730

SHOCK AND VIBRATION PROOF OSCILLATOR

Walter Kohlhagen, Elgin, Ill., assignor to The E. Ingraham Company, Bristol, Conn., a corporation of Connecticut Application March 20, 1952, Serial No. 277,626

9 Claims. (Cl. 58—116)

This invention relates to oscillators in general, and to shock and vibration proof oscillators in particular.

There have become known mechanical and magnetic escapements of a type which, with the exception of the escape member itself, are embodied in a single oscillator unit having an inertia member and a leaf-type spring by means of which the inertia member is suspended from a support and is oscillatory about an axis extending transversely of and intermediate the length of the spring between the inertia member and support. Several forms of a mechanical escapement of this type are shown and described in my copending application Serial No. 232,122, filed June 18, 1950, now Patent No. 2,679,722, granted June 1, 1954, while a form of magnetic escapement of this type is shown and described in the pending application of Cecil Frank Clifford, Serial No. 96,747, filed June 2, 1949, now Patent No. 2,690,646, granted October 5, 1954. While in the preferred constructions of the oscillator units of these escapements the centers of gravity coincide with the oscillatory axes thereof so that these units are not overly disturbed in their performance by mild acceleration and deceleration, shock or vibration, they are definitely disturbed in their performance, and may even cease to perform altogether, if they are subjected to more rapid acceleration and deceleration, or more severe shock or vibration, such as some clocks or watches and some timing devices for other purposes are subjected to.

It is, therefore, the primary aim and object of the present invention to make provisions in oscillator units of this type to render their performance proof against even exceptionally fast acceleration and deceleration and severe shock or vibration, thereby not only to improve their long, accurate and reliable performance in clocks and watches, but also to extend their use into other timing fields for which they were unsuited heretofore.

Another object of the present invention is to render the performance of oscillator units of this type proof against fast acceleration and deceleration and severe shock or vibration, in an exceedingly simple structural manner which does not involve any change in or modification of the oscillator structure itself and adds little, if any, to the low cost of the oscillator unit.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a side-elevation, partly in section, of a mechanical escapement embodying the present invention;

Fig. 2 is a top-plan view of the same escapement;

Fig. 3 is a section taken on the line 3—3 of Fig. 2;

Fig. 4 is a section taken on the line 4—4 of Fig. 1;

Fig. 5 is a view similar to Fig. 1, showing the escapement in different positions of operation in full lines and dot-and-dash lines, respectively;

Fig. 6 is an enlarged diagrammatic view illustrating the coordination of certain prominent parts of the escapement;

Fig. 7 is a side-elevation, partly in section, of a modified mechanical escapement embodying the present invention;

Fig. 8 is a top-plan view of the modified escapement shown in Fig. 7;

Fig. 9 is an enlarged diagrammatic view illustrating the coordination of certain prominent parts of the modified escapement of Figs. 7 and 8;

Fig. 10 is a fragmentary top plan view of an escapement similar to that shown in Fig. 8, but showing a modified form of the invention;

Fig. 11 is a perspective view of a magnetic escapement embodying the present invention;

Fig. 14 is a fragmentary longitudinal section through the oscillator unit of Fig. 1, and showing another modified form of the present invention; and Fig. 15 is a reduced transverse section through a modified oscillator unit embodying the present invention.

Figure 12:
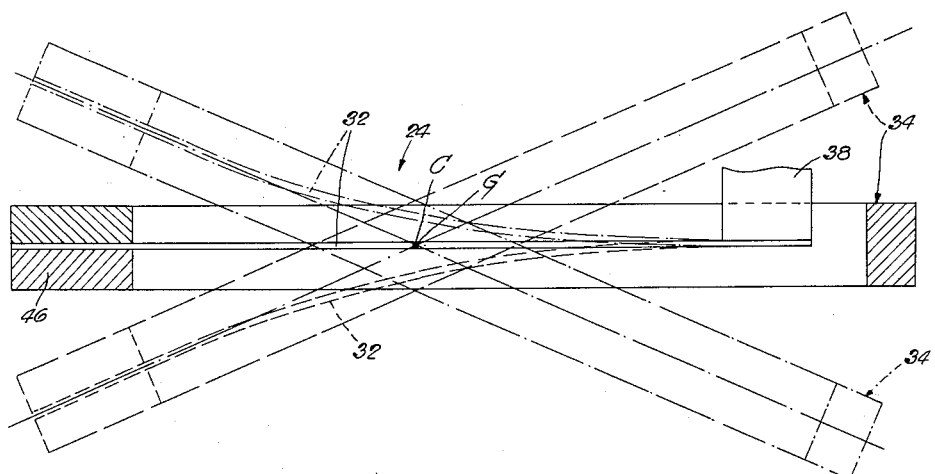
Fig. 12 is a diagrammatic view of the oscillator unit of each of the foregoing escapements, the oscillator unit being shown in different operating positions.

Referring to the drawings, and more particularly to Figs. 1 to 5 thereof, the reference numeral 20 designates an escapement which comprises an escape member or wheel 22 and an oscillatory unit 24. The escape-wheel 22, which is journalled in a suitable support 26 and provided with identical peripheral teeth 28, is coupled with a power-drive (not shown) through intermediation of a gear 30, for instance.

The oscillatory unit 24 comprises, in the present instance, a leaf-type spring 32 and a rigid inertia mass or member 34, of which the spring 32 is of sufficient stiffness to support the oscillator unit in any position so that the same is always in operating relation to the associated escapement parts. The leaf-spring 32 is mounted with one end 36 thereof on a fixed support 38 by means of a suitably locked screw or screws 40, for instance, and the inertia-member 34 is carried by the opposite end 42 of the leaf-spring 32 in a manner to be described. The inertia-member 34 is, in the present instance, in the form of a rectangular frame having opposite side-bars 44 and opposite end-bars 46. One of the end-bars 46 of the inertia-member 34 is, in this instance, grooved as at 48 (Fig. 1) for the reception of the spring-end 42 which is suitably anchored therein by means of a filler-block 50 and a rivet 52, for instance (see also Fig. 4).

Riveted or otherwise secured at 54 to one of the side-bars 44 of the inertia-member 34 are spaced lugs 56 of a side-plate 58 which carries spaced pallets 60a and 60b that are adapted alternately to react with succeeding teeth 28 of the escape-wheel 22 in a manner described hereinafter.

The unit 24 will, on receiving periodic oscillatory impulses from the teeth 28 of the escape-wheel 22 in a manner to be described, oscillate about the axis C through an amplitude similar to or like that indicated by the full-line and dot-and-dash line positions of the unit in Fig. 5, which may be considered to be the extreme end positions of the unit. Further, the escape-direction of the wheel 22 is, in the present instance, counter-clockwise as viewed in Fig. 5. Thus, the "let-off" pallet 60b is, in the full-line end position of the unit 24, in locking engagement with the tooth 28' of the escape-wheel 22, while the "receiving" pallet 60a is retracted from the wheel-teeth 28, wherefore the escape-wheel 22 is then in an intermittent stop position. As the unit 24 starts to swing from the full-line position toward the dot-and-dash line position in Fig. 5, the let-off pallet 60b will clear the leading or stop flank 62 of the tooth 28' and thereby release the wheel 22 for the next escape-step. The pallets 60a and 60b are so coordinated that the receiving pallet 60a will move into the path of the stop flank 62 of the next wheel-tooth 28'' approximately when the other pallet 60b clears the stop flank 62 of the wheel-tooth 28', so that the escape-wheel 22 will, at the end of the next escape-step thereof, assuredly be stopped by the receiving pallet 60a with which the wheel-tooth 28'' will then be in locking engagement. Also, the let-off pallet 60b will, immediately on clearing the stop-flank 62 of the wheel-tooth 28', receive from the cam-shaped top 64 of the latter an oscillatory impulse which is directed clockwise as viewed in Fig. 5. This oscillatory impulse is transmitted to the unit 24 when the latter is well on its way toward the dot-and-dash line position (Fig. 5), and the unit 24 will continue to move in this direction until the increasingly flexed spring 32 reverses the direction of oscillation of the unit 24 when the latter arrives at the dot-and-dash line position. On the following reverse oscillation of the unit 24, the receiving pallet 60a will clear the stop-flank 62 of the wheel-tooth 28'' and thereby release the escape-wheel 22 for the following escape-step, while the let-off pallet 60b will move into the path of the next wheel-tooth 28''' to stop the escape-wheel at the end of said following escape-step. Further, the receiving pallet 60a will, immediately on clearing the stop-flank 62 of the wheel-tooth 28'', receive from the cam-shaped top 64 of the latter an oscillatory impulse which is transmitted to the unit 24 in a counter-clockwise direction as viewed in Fig. 5. The pallets 60a and 60b thus come into alternate play and react with succeeding teeth 28 of the escape-wheel 22 in receiving oscillatory impulses therefrom and permitting periodic step-by-step escape of the latter. When the power-drive is idle, the oscillator-unit will, by the urgency of the spring 32, assume the rest position shown in Fig. 1 in which the pallets 60a and 60b are out of the path of the stop-flanks 62 of the wheel-teeth 28, but in the path of the cam-shaped tops 64 of the latter (see also the full-line positions of the pallets in Fig. 6), so that the next active wheel-tooth, in this instance, the wheel-tooth 28'''' (Fig. 1), will start the oscillation of the unit 24 when the power-drive is again operative.

Fig. 12 illustrates diagrammatically the oscillatory unit 24 of the present escapement, and explains the location of the oscillatory axis C thereof. Thus, assuming the leaf spring 32 to be of uniform cross-section throughout, the oscillatory axis C of the unit 24 lies in the plane of the spring 32 and extends at right angles to the spring exactly midway of its length between the fixed support 38 and the end bar 46 of the inertia member 34 to which the spring is attached, when the inertia member is in the full-line repose position. The oscillatory axis C of the unit 24 will remain substantially fixed at the above-described location during normal oscillation of the unit, and the inertia member 34 will, except as hereinafter explained further, move as though being rocked about the oscillatory axis C as a fixed pivot axis, while the spring 32 will alternately bend to opposite sides of the oscillatory axis C on swinging into its extreme positions as shown in dotted lines and in dot-and-dash lines, respectively, in Fig. 12.

The leaf-spring 32 and inertia-member 34 of the oscillator-unit 24 are so coordinated that the center of gravity G of the inertia-member lies substantially on the oscillatory axis C of the unit. Assuming, therefore, that the free length of the spring 32 between the ends 36 and 42 thereof is of uniform width throughout, the oscillatory axis C will, as previously explained, rectangularly intersect the spring 32 midway of the free length of the latter as indicated by the distances $l$ in Fig. 6, and the inertia-member will have to be arranged so that its center of gravity G lies on this axis. Preferably, also, the inertia-member 34 is so arranged that its center of gravity G lies on the central longitudinal axis $x$—$x$ of the leaf-spring 32 (Fig. 2). To this end, the mass of the inertia-member 34 is substantially equally distributed on the opposite sides of the central longitudinal axis $x$—$x$ of the spring 32. In view of the fact that the center of gravity G of the inertia-member 34 lies on, or substantially on, the oscillatory axis C of the unit 24, the latter is in its normal oscillation disturbed very little, if at all, by ordinary shock or vibration.

While the oscillatory impulses imparted by the wheel-teeth 28 to the pallets 60a and 60b set up rotary couples in the unit 24 which sustain its continuous oscillation at uniform frequency, all other forces from the escape-wheel 22 against the unit 24 should be prevented from setting up such rotary couples in the unit 24 so as not to interfere with the normal oscillation of the latter. These other forces are the periodic thrusts of succeeding wheel-teeth 28 against the pallets 60a and 60b, and in order that these thrusts may not set up rotary couples in the oscillating unit 24, they are directed so as to pass through the oscillatory axis C of the unit 24. To this end, the teeth 28 of the escape-wheel 22 are so designed that the stop flank 62 of each tooth lies, when in locking engagement with either pallet 60a or 60b, in a plane substantially at right angles to the plane in which the locking pallet and the oscillatory axis C of the unit 24 lie (Fig. 6). Thus, the thrust from the stop-flank 62 of each tooth 28 against the receiving pallet 60a is indicated by the vector A in Fig. 6, said vector extending at right angles to the flank 62 of the pallet-engaging tooth 28 and passing through the oscillatory axis C and also through the receiving pallet in the dot-and-dash line position 60a' in which the latter may be assumed to be struck by the adjacent wheel tooth 28 when the same moves thereagainst. The thrust from the stop-flank 62 of each tooth against the let-off pallet 60b is equal to the thrust from each tooth against the receiving pallet 60a, and is indicated by the vector B (Fig. 6) which in a similar manner passes through the let-off pallet in the dot-and-dash line position 60b' thereof in which the latter may be assumed to be struck by each tooth 28. Since the teeth 28 of the escape-wheel 22 are identical, the beforementioned thrust-vectors A and B will be equal and pass through the oscillatory axis C of the unit 24 only if the pallets 60a and 60b are equally spaced from the oscillatory axis C of the unit 24 and also from the rotary axis R of the escape-wheel 22, when the unit 24 is at rest. That these conditions prevail in the present instance is clearly indicated in Fig. 6 in which the pallets assume the respective full-line positions when the unit 24 is at rest. Accordingly, since the thrust-vectors A and B pass through the oscillatory axis C of the unit 24, the normal oscillation of the latter is in nowise affected by the clash of the stop-flank 62 of each wheel-tooth with either pallet.

The thrust-vectors A and B (Fig. 6) have components A', B' and A'', B'' which are directed longitudinally of the spring 32 and at right angles thereto, respectively. Of these, the components A' and B' create harmless tensile and compressive stresses, respectively, in the spring 32, and the components A'' and B'' cause, or tend to cause, translatory movement of the unit 24 transversely of the spring 32 which is, however, of such small magnitude as not to interfere in the least with the reliable and accurate performance of the escapement.

The forces imparted by the cam-shaped tops 64 of the wheel-teeth 28 to the pallets 60a and 60b and transmitted to the unit 24 as oscillatory impulses, have similar components directed longitudinally of the spring 32 and at right angles thereto. These components are, however, as harmless as the previously described components A', B' and A'', B'' insofar as the reliable and accurate performance of the escapement is concerned.

The escapement described so far, which is fully disclosed in my before-mentioned copending application, Serial No. 232,122, is exceedingly simple and sturdy in construction, and is in its reliable and accurate performance disturbed very little, if at all, by ordinary shock or vibration. By being pivotless, the oscillator unit of the instant escapement is devoid of external frictional resistance in its operation, and hence, requires no lubrication and has an exceptionally long useful life. Further, the oscillator-unit of the instant escapement requires little power for sustained oscillation, and this power is derived solely from the escape-wheel. Also, the oscillator unit of the present escapement requires for its reliable and accurate performance but a small amplitude of vibration and, hence, less acceleration and deceleration of its mass than conventional balance-wheel type escapements with their lively-acting inertia masses, wherefore the instant oscillator unit reacts with the escape-wheel in a much less abrupt fashion and is, in consequence, less noisy and more reliable in operation than previous mechanical escapements. Moreover, the oscillator-unit of the present escapement permits the construction of the escape-wheel in any desired diameter and its location in any desired proximity to the oscillator-unit, thereby removing practically all previous obstacles to the attainment of a dead-beat escapement without sacrificing good lock and throw characteristics of the same.

While the hereinbefore described escapement is in its reliable and accurate performance disturbed very little, if at all, by mild shock or vibration or slow acceleration and deceleration, it is definitely disturbed in its performance, and may well cease to perform altogether or even become damaged beyond repair, if subjected to more severe shock or vibration or more rapid acceleration and deceleration such as some clocks or watches and some timing devices for other purposes are subjected to. In accordance with the present invention, provisions are made whereby the escapement will perform satisfactorily and will assuredly not become damaged even if subjected to severe shock or vibration or very fast acceleration and deceleration. In this connection, it is even contemplated that the escapement should perform satisfactorily and reliably when used as a time fuse in shrapnel or other missiles which are subjected to exceptional shock and acceleration. To this end, the inertia member 34 carries two opposite pins 61 and 63 which extend in line with the oscillatory axis C of the unit 24 (Figs. 2 and 3), and are received in apertures 65 and 67 in fixed motion-limiting or "limit" plates 69 and 71, respectively. In the present instance, the pin 61 is carried by the pallet-carrying side plate 58, while the other pin 63 is carried by a bracket 73 which is riveted or otherwise mounted at 75 on the inertia member 34.

It has previously been explained that the inertia member 34 will, on normal oscillation of the unit 24, move as though being rocked about the oscillatory axis C as a fixed pivot axis. Further, inasmuch as the center of gravity G of the oscillatory unit 24 lies on the oscillatory axis C, all forces acting on the unit 24 from shock or vibration or from acceleration and deceleration will be centered in the oscillatory axis C. However, by providing the inertia member 34 with the opposite pins 61 and 63 and extending them into the apertures in the fixed limit plates 69 and 71, the inertia member 34 is effectively restrained at the oscillatory axis C against all movement other than rocking movement thereabout. Hence, all forces on the inertia member 34 resulting from even severe shock or vibration or from most rapid acceleration and deceleration will at their very transmittal point, namely, the oscillatory axis C, immediately and harmlessly be transmitted in toto by the pins 61 and 63 to the fixed limit plates 69 and 71, and thus hardly, if at all, disturb the normal oscillation of the unit 24.

Figure 13:
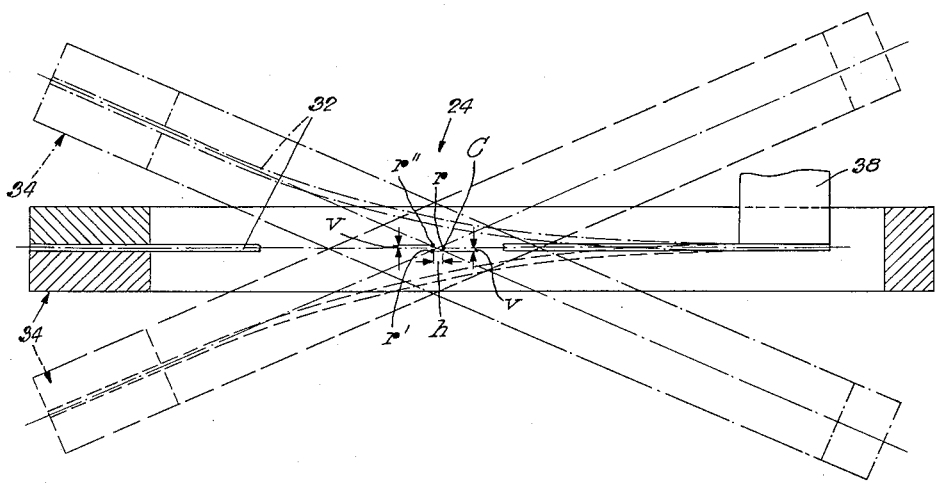
Fig. 13 is an enlarged diagrammatic view of the oscillator unit similar to Fig. 12, and illustrates the shift of the oscillatory axis of the unit in different operating positions of the latter.

While it was hereinbefore explained that the oscillatory axis C of the unit 24 will remain substantially fixed during normal oscillation of the unit, the actual rocking axis of the inertia member 24 will shift to a very slight extent away from and into coextension with the fixed oscillatory axis C during each oscillation of the unit. To understand this very slight, though unavoidable shift of the rocking axis of the inertia member 34 during oscillation of the unit 24, attention is directed to Fig. 13. Thus, the fixed oscillatory axis of the unit 24 lies, as previously mentioned, in the plane and midway of the free length of the spring 32 between the fixed support 38 and the inertia member 34. Accordingly, the oscillatory axis is correctly located at C, and the rocking axis r of the inertia member 34 coincides with the oscillatory axis C when the unit 24 is in the full-line repose position. The pins 61 and 63 are located on the inertia member 34 so that they extend coaxially of the rocking axis r of the inertia member, i. e. the transverse axis of the inertia member which passes through the center of gravity G of the latter and, in the repose position of the unit 24, coincides with the oscillatory axis C. Now, as the spring 32 bends during oscillation of the unit 24 from its full line repose position into either of the extreme end positions shown in dotted lines and in dot-and-dash lines, respectively, in Fig. 13, it stands to reason that the inertia member 34 has a compound motion of which one motion is a rocking motion about its rocking axis r and the other motion is a bodily motion. The bodily motion of the inertia member 34 is primarily a longitudinal motion occasioned by the ever varying distance between the fixed support 38 and the spring-anchored end of the inertia member when the spring 32 bends continuously in the course of normal oscillation of the unit 24. Thus the rocking axis r of the inertia member 34 is at the locations r' and r'' when the inertia member is in the extreme end positions shown in dotted lines and in dot-and-dash lines, respectively. These extreme positions r' and r'' of the rocking axis of the inertia member are, for better illustration, shown spaced from the oscillatory axis C and from each other to an exaggerated extent. Actually, the longitudinal forward and backward creep of the inertia member during natural oscillation of the unit 24 is very slight, but is nevertheless existent. Also existent during normal oscillation of the unit 24 is a much slighter transverse creep of the inertia member 34, as is indicated by the vertical spacing of the shifted rocking axes r' and r'' of the inertia member in Fig. 13. Accordingly, the rocking axis r of the inertia member with the coaxially extending pins 61 and 63 move during natural oscillation of the unit 24 in a path between the axis locations r, r' and r'' in Fig. 13. How very slight the bodily creep of the inertia member during normal oscillation of the unit 24 really is follows from the following example. Thus, on normal oscillation through a total swing of 15° of a unit approximately half the size of that shown in Fig. 13, the overall horizontal component h of the bodily creep of the inertia member was found to be approximately fifteen ten-thousandths of an inch, while the vertical component v of the bodily creep of the inertia member to either side of its repose disposition was found to be approximately one ten-thousandth of an inch.

In order that the very slight, but nevertheless existing bodily creep of the rocking axis r and coaxial pins 61 and 63 of the inertia member 34 will not interfere with the normal oscillation of the unit 24, the pins 61 and 63 are given sufficient clearance in the apertures 65 and 67 of the fixed limit plates 69 and 71, respectively, as is clearly shown in Fig. 6. Conveniently, the apertures in the limit plates 69 and 71 are in the form of round holes which afford the necessary clearance from the pins 61 and 63.

It follows from the preceding that the instant provision of the pins 61 and 63 on the inertia member and the fixed limit plates 69 and 71 constitute an exceedingly simple structural expediency for rendering the performance of the instant escapement as a time fuse for projectiles proof against even such exceptionally severe shock and acceleration to which the latter are subjected. The great structural simplicity of the instant motion-limiting provisions renders the latter also ideally suited for installation in escapements for clocks and other time pieces to protect them from the worst possible shock or vibration, acceleration or deceleration, to which they may be subjected during storage, shipment or daily use. The instant motion-limiting provisions are of further advantage in that they afford in the assembly of the oscillator unit a ready and accurate check of the desired approximate coaxial extension of the pins with the oscillatory axis of the unit. Thus, the unit will oscillate freely and without any obstruction from the apertured limit plates when the pins are properly coaxially aligned with the oscillatory axis of the unit. On the other hand, the unit will unmistakably be obstructed in its oscillation by the apertured limit plates when the pins are out of coaxial alignment with the oscillatory axis of the unit, in which case the pins will have to be shifted on the inertia member until they are in substantial alignment with the oscillatory axis of the unit.

Figs. 7 and 8 show a modified escapement 20a which is in all major respects identical with the previously described escapement 20, except that the escape-wheel 22a lies primarily on one side of the plane of the spring 32a so that its peripheral teeth 28a may come into play and react with pallets 70a and 70b which are carried directly by the inertia member 34a. The escape-direction of the wheel 22a may be assumed to be counter-clockwise as viewed in Figs. 7 and 9, in which case the pallets 70a and 70b are the receiving and let-off pallets, respectively. The instant modified escapement 20a secures all the advantages of the previously described escapement 20, although the forces acting thereon are of different magnitudes. Thus, the vectors D and E (Fig. 9), which represent the thrusts from the teeth 28a of the wheel 22a against the pallets 70a and 70b, respectively, form much more acute angles with the longitudinal axis of the oscillator unit 24a than do the vectors A and B (Fig. 6) in the previously described escapement 20, wherefore the components D', E' of the vectors D and E create harmless tensile or compressive stresses in the spring 32a, while the transverse components D'' and E'' are considerably smaller in magnitude than the corresponding components A'' and B'' in the previously described escapement and, hence, have a lesser tendency to cause translatory movement of the unit 24a. On the other hand, while the translatory components, transversely of the spring 32a, of the forces imparted by the cam-shaped tops 64a of the wheel-teeth 28a to the pallets 70a and 70b are greater than in the previous escapement, these translatory components remain so small that they will not interfere with the reliable and accurate performance of the instant modified escapement.

Assuming that the escape-direction of the wheel 22a be, as stated hereinbefore, counter-clockwise as viewed in Fig. 9, the fixed support 38a for the spring 32a is preferably so located, to the left of the wheel 22a in the present instance (Fig. 9), that the components E' and D' of the forces E and D, respectively, create in the spring 32a compressive stresses which have a tendency to counteract translatory movement of the unit 24a transversely of the spring 32a.

As best shown in Fig. 8, the pallets 70a and 70b project in this instance inwardly from one of the side-bars 44a of the inertia-member 34a and the escape-wheel 22a extends between said side bar and the adjacent side edge of the spring 32a, wherefore the thrusts from the teeth 28a of the wheel 22a against the pallets 70a and 70b will create in the spring 32a less torsional stress than do the thrusts A and B in the previous escapement 20 in which the pallets 60a and 60b project outwardly from the inertia-member 34. However, these torsional stresses fail, in either form of the escapement, adversely to affect the reliable and accurate performance of the escapement.

Like the previously described escapement 20, the instant modified escapement 20a is provided with the pin and limit plate provisions 61a, 63a, 69a and 71a. The pins 61a and 63a, which are shown as carried by brackets 73a, respectively, on the inertia member 34a, extend coaxially of the oscillatory axis C' of the unit 24a on which the center of gravity G' of the latter is also located. The pins 61a and 63a extend with the necessary clearance into the apertures in the fixed limit plates 69a and 71a, respectively. Accordingly, the modified escapement 20a is as proof against even most severe shock or vibration, or most rapid acceleration and deceleration, as is the first described escapement 20.

Fig. 10 is a fragmentary plan view of the modified escapement of Fig. 8, and illustrates an alternative arrangement of the pin and limit plate provisions. Thus, the pins 61b and 63b may be carried by the fixed plates 69b and 71b, respectively, and project with clearance into apertures 65b and 67b in the adjacent side bars 44b, respectively, of the inertia member.

Fig. 11 shows the instant pin and limit plate provisions applied to the oscillator unit 80 of a magnetic escapement 82 of the type which is fully shown and described in the hereinbefore mentioned copending application of Cecil Frank Clifford, Serial No. 96,747. The rotary escape wheel 84 has an endless magnetic track 86 with which are magnetically coupled the opposite poles 88 of a U-shaped permanent magnet 90 that forms the inertia element of the oscillator unit 80. The yoke 92 of the magnet 90 is secured at 93 to one end of a leaf spring 94 of which the other end is mounted on a fixed support 96. On rotation of the escape wheel 84, counter-clockwise as viewed in Fig. 11, the poles 88 of the magnet 90 of the oscillator unit 80 will follow the somewhat sinuous track 86, and the oscillator unit will, during its sustained natural oscillation by periodic impulses from the escape wheel, control the rotation of the latter.

The oscillatory axis C'' of the unit 80 lies midway of the free length of the spring 94, and the center of gravity G'' lies on the oscillatory axis C'', as in the previous examples. The pins 61c and 63c, which as heretofore extend coaxially of the oscillatory axis C'', are carried by brackets 100 and 102, respectively, on the magnet 90, and extend with sufficient clearance into the apertures 104 and 106 of fixed limit plates 108 and 110, respectively.

While in each of the hereinbefore described oscillator units the inertia member is carried by a leaf-type spring which bends longitudinally during normal oscillation of the unit, the oscillator unit 112 of Fig. 15 provides an inertia member 114 which is carried at 116 by one end of a torsion spring 118 of which the other end is carried at 120 by a fixed support 122. The torsion spring 118 is, in this instance, a rod of slightly resilient metal. Accordingly, the oscillatory axis C''' of the instant unit is coincident with the longitudinal axis of the torsion spring 118. Preferably, the instant unit is so designed that the center of gravity G''' of the inertia member 114 lies on the oscillatory axis C''' of the unit, thereby rendering the latter shock-proof to some extent even without the additional pin and limit plate provisions to be described presently.

Provided in this instance on the opposite ends of the inertia member 114 are pins 124 and 126, respectively, which are in coaxial alignment with the oscillatory axis C''' and are received in apertures in fixed limit plates 128 and 130, respectively. Since during normal oscillation of the instant unit about the oscillatory axis C''' the torsional distortion of the spring member 118 will cause only a longitudinal back and forth creep of the inertia member, the pins 124 and 126 need not have any clearance in the apertures in the respective limit plates 128 and 130, and require merely such a fit therein as to permit free and unobstructed rotation of the inertia member 114 about the oscillatory axis C'''. However, the opposite ends of the inertia member 114, and accordingly the inner ends of the exposed lengths of the pins 124 and 126, must be sufficiently spaced from the respective limit plates 128 and 130 to permit the very small, though unavoidable bodily longitudinal creep of the inertia member 114 during normal oscillation of the unit.

The instant oscillator unit 112 is shown without pallets or magnet poles for its use in a mechanical or magnetic escapement, but pallets or magnet poles may be provided on the inertia member in many different ways for the use of the unit in a mechanical or magnetic escapement.

While the hereinbefore described oscillator units are, merely by way of example, shown in conjunction with mechanical or magnetic escapements, these oscillator units are by no means limited in their use to escapements. Thus, it is fully within the scope of the present invention to use these oscillator units for any suitable purposes whatsoever. For instance, these oscillator units may be impulsed electrically, rather than mechanically or magnetically, and they may also be used for purposes other than driving or controlling a drive.

The present invention also involves a method of rendering the hereinbefore described oscillator units proof against even severe shock or vibration, or against exceptionally fast acceleration and deceleration. Thus, the full benefits of the present invention may be obtained by structural provisions other than the herein disclosed preferred pin and limit plate provisions. For example, the top and bottom surfaces of each of the side bars 44 of the inertia member 34 of the hereinbefore described oscillator unit 20 may carry roller portions 140, respectively, which project with adequate clearance into sockets 142 in fixed limit members 144, respectively (Fig. 14). The roller portions 140 of the inertia member complement each other to form a roller the axis of which coincides with the oscillatory axis C of the unit. Underlying the hereinbefore described and other structural provisions for rendering the exemplary oscillator unit 20 proof against shock or vibration, or against acceleration and deceleration, is the method step of arresting the inertia member at the oscillatory axis of the unit against movement, at least transversely of the inertia member, beyond the limits of the unavoidable bodily creep of the inertia member during normal oscillation of the unit.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A shock and vibration proof oscillator, comprising a fixed support; a spring mounted with one end on said support; a rigid inertia member mounted on the other end of said spring so that the intermediate length of said spring is resiliently deformable, said inertia member and spring length being coordinated to form an oscillatory unit the oscillatory axis of which passes substantially through the center of gravity of said inertia member; and a fixed member, one of said members having a part with a longitudinal axis substantially in alignment with said oscillatory axis, and the other member having an aperture receiving said part for limited relative bodily movement of said members to prevent at all times bodily movement of said inertia member substantially other than its bodily creep during normal oscillation of said unit.

2. A shock and vibration proof oscillator, comprising a fixed support; a leaf-type spring mounted with one end on said support; a rigid inertia member mounted on the other end of said spring so that the intermediate length of said spring is resiliently flexible, said inertia member and spring length being coordinated to form an oscillatory unit the oscillatory axis of which extends at right angles to said spring length and passes substantially through the center of gravity of said inertia member; and a fixed member, one of said members having a part with a longitudinal axis substantially in alignment with said oscillatory axis, and the other member having an aperture receiving said part with such clearance as to prevent at all times bodily movement of said inertia member substantially other than its bodily creep, at least transversely of said spring in its repose position, during normal oscillation of said unit.

3. A shock and vibration proof oscillator as set forth in claim 2, in which said aperture receives said part with such clearance as to prevent at all times bodily movement of said inertia member substantially other than its bodily creep, both transversely and longitudinally of said spring in its repose position, during normal oscillation of said unit.

4. A shock and vibration proof oscillator, comprising a fixed support; a leaf-type spring mounted with one end on said support; a rigid inertia member mounted on the other end of said spring so that the intermediate length of said spring is resiliently flexible, said inertia member and spring length being coordinated to form an oscillatory unit the oscillatory axis of which extends at right angles to said spring length and passes substantially through the center of gravity of said inertia member, and said inertia member having a part with a longitudinal axis in substantial alignment with said oscillatory axis; and fixed apertured means receiving said part with at least such clearance as to prevent at all times bodily movement of said inertia member substantially other than its bodily creep, at least transversely of said spring in its repose position, during normal oscillation of said unit.

5. A shock and vibration proof oscillator as set forth in claim 4, in which said part of said inertia member is constituted by pins on the opposite sides, respectively, of the latter in substantial coaxial alignment with said oscillatory axis, said apertured means are fixed apertured elements adjacent the opposite sides, respectively, of said inertia member, and said pins are received with clearance in the apertures in said elements, respectively.

6. A shock and vibration proof oscillator as set forth in claim 4, in which said part of said inertia member is constituted by opposite complemental part-roller-like formations on the latter having a common roller axis substantially coincident with said oscillatory axis, and said fixed apertured means have opposite surfaces between which said roller-like formations on said inertia member extend with clearance.

7. A shock and vibration proof oscillator as set forth in claim 4, in which said part of said inertia member is constituted by opposite complemental part-roller-like formations on the latter having a common roller axis substantially coincident with said oscillatory axis, and said fixed apertured means have opposite complemental part-cylindrical surfaces between which said roller-like formations on said inertia member extend with clearance.

8. A shock and vibration proof oscillator, comprising a fixed support; a leaf-type spring mounted with one end on said support; a rigid inertia member mounted on the other end of said spring so that the intermediate length of said spring is resiliently flexible, said inertia member and spring length being coordinated to form an oscillatory unit the oscillatory axis of which extends at right angles to said spring length and passes substantially through the center of gravity of said inertia member; means providing apertures on the opposite sides, respectively, of said inertia member and in substantial alignment with said oscillatory axis; and axially aligned fixed pins adjacent the opposite sides, respectively, of said inertia member, said pins extending into said apertures, respectively, with at least such clearance as to prevent at all times bodily movement of said inertia member substantially other than its bodily creep during normal oscillation of said unit.

9. A shock and vibration proof oscillator, comprising a fixed support; a torsion spring mounted with one end on said support; a rigid inertia member mounted on the other end of said torsion spring so that the intermediate length of said spring is resiliently distortable, said inertia member and spring length being coordinated to form an oscillatory unit the oscillatory axis of which is coextensive with the longitudinal axis of said torsion spring and passes substantially through the center of gravity of said inertia member; and a fixed member, one of said members having a part with a longitudinal axis substantially in alignment with said oscillatory axis, and the other member being apertured to receive said part for limited relative bodily movement of said members to prevent at all times bodily movement of said inertia member substantially other than its bodily creep during normal oscillation of said unit.

References Cited in the file of this patent

UNITED STATES PATENTS

| | | |
|---|---|---|
| 369,568 | Street | Sept. 6, 1887 |
| 1,825,382 | Baker | Sept. 29, 1931 |

FOREIGN PATENTS

| | | |
|---|---|---|
| 58,998 | Austria | May 10, 1913 |
| 937,840 | France | Apr. 18, 1951 |